United States Patent
Scandurra et al.

(10) Patent No.: US 8,576,879 B2
(45) Date of Patent: Nov. 5, 2013

(54) COMMUNICATION SYSTEM AND METHOD

(75) Inventors: Alberto Scandurra, Messina (IT);
Giuseppe Guarnaccia, Catania (IT);
Ignazio Antonino Urzi', Voreppe (FR)

(73) Assignees: STMicroelectronics (Grenoble 2) SAS, Grenoble (FR); STMicroelectronics S.r.l., Agrate Brianza (IT)

(*) Notice: Subject to any disclaimer, the term of this patent is extended or adjusted under 35 U.S.C. 154(b) by 195 days.

(21) Appl. No.: 13/117,538

(22) Filed: May 27, 2011

(65) Prior Publication Data

US 2011/0320669 A1    Dec. 29, 2011

(30) Foreign Application Priority Data

May 27, 2010   (IT) .............................. TO2010A0443

(51) Int. Cl.
*H04J 3/24*       (2006.01)

(52) U.S. Cl.
USPC ........... 370/474; 370/230; 370/235; 370/389; 370/476; 710/305; 712/300

(58) Field of Classification Search
None
See application file for complete search history.

(56) References Cited

U.S. PATENT DOCUMENTS

| | | | |
|---|---|---|---|
| 2002/0051427 A1* | 5/2002 | Carvey ......................... | 370/254 |
| 2005/0027880 A1* | 2/2005 | Emmot ......................... | 709/238 |
| 2005/0152350 A1 | 7/2005 | Sung et al. ................... | 370/376 |
| 2007/0047584 A1* | 3/2007 | Spink et al. .................. | 370/474 |
| 2008/0016269 A1 | 1/2008 | Chow et al. .................. | 711/103 |
| 2009/0300292 A1* | 12/2009 | Fang et al. .................. | 711/141 |
| 2011/0243154 A1* | 10/2011 | Flynn et al. .................. | 370/471 |

* cited by examiner

*Primary Examiner* — Nicholas Sloms

(74) *Attorney, Agent, or Firm* — Seed IP Law Group PLLC

(57) ABSTRACT

A communication system for transmitting data, for example, within a System-in-Package. The system includes a first circuit configured for: a) dividing the data into a plurality of packets having a determined size; and b) creating for each of the packets a transmission segment including a segment header and the respective packet as payload. The system also includes a second circuit configured for: a) separating the transmission segments into a plurality of physical units, where the physical units have a determined size; and b) transmitting the physical units over a physical communication channel. In particular, the segment header includes at least one field that identifies the number of physical units that are to be transmitted.

16 Claims, 5 Drawing Sheets

| Seq | N |
|---|---|
| "000000" | 0 |
| "000001" | 4 |
| "000010" | 5 |
| "000011" | 11 |
| "000100" | 18 |
| "000101" | 20 |
| "000110" | 25 |
| "000111" | 32 |
| "001000" | 35 |
| "001001" | 39 |
| "001010" | 46 |
| "001011" | 50 |
| "001100" | 53 |
| "001101" | 60 |
| "001110" | 65 |
| "001111" | 67 |
| "010000" | 74 |
| "010001" | 80 |

*Fig. 6*

COMMUNICATION SYSTEM AND METHOD

BACKGROUND

1. Technical Field

The present disclosure relates to communication techniques.

The disclosure has been developed with particular attention paid to its possible use in the so-called Network-in-Package (NiP) architectures, such as the ones used for communication between different circuits integrated within a System-in-Package (SiP) that require a high level of performance.

2. Description of the Related Art

Systems-in-Package (SiPs) are heterogeneous electronic systems that comprise a plurality of integrated circuits. For instance, said integrated circuits are frequently mounted directly as dice in a common package and communicate with one another via a network for communication within the package, referred to as Network-in-Package (NiP).

For instance, such SiPs are particularly useful for interfacing integrated circuits that have been produced with different manufacturing processes.

For instance, the improvement of the processes for manufacturing integrated circuits enables reduction of the so-called "feature size", i.e., the size of the elements within the integrated circuit, and, from the reduction in the feature size, there also follows a respective reduction in the size of the entire integrated circuit. For instance, the size of a digital integrated circuit decreases typically by 55% when the same circuit is implemented with a 65-nm technology instead of a 90-nm technology.

However, said improvement does not extend directly to the analog or input/output (I/O) cells, which leads to severe limitations during design of complex systems within an integrated circuit such as Systems-on-Chip (SoCs).

For instance, in some cases, the core of the integrated circuit can be small, but the size of the integrated circuit must be increased on account of the number and/or size of the pads of the integrated circuit, this being known as "pad-limited design."

Furthermore, when a technology with small feature size is used, for example a sub32-nm technology, a high speed of the I/O logic can, in some cases, only be achieved with a low supply voltage. For instance, a memory of the Double-Data-Rate version 3 (DDR3) type can work at an operating frequency of 800 MHz and a supply voltage of 1.5 V.

However, complex circuits can also comprise communication interfaces with higher voltages, for example a communication interface of the "High-Definition Multimedia Interface" (HDMI) type, of the "Serial Advanced Technology Attachment" (SATA) type, or of the "Universal Serial Bus" version 3 (USB3) type. For instance, in one case, the communication interface of the DDR3 memory forms a gate oxide with a thickness of 30 Å, whereas the HDMI communication interface would form a thickness of 50 Å. However, this case cannot be obtained with a single manufacturing process.

Instead, said system can be obtained via a System-in-Package by separating the subcircuits of the traditional SoC into a plurality of dice (i.e., a plurality of integrated circuits) to form a System-in-Package. For instance, said SiP could consist of a first die (i.e., a first integrated circuit) obtained with a 32-nm technology that comprises the digital processing circuits, for example a high-speed processor, a DDR3 control unit, and other Intellectual-Property (IP) cores. Said first die can be connected to a second die (i.e., a second integrated circuit) obtained with a 55-nm technology that comprises analog circuits and/or various communication interfaces.

However, in this architecture, the communication between the aforesaid dice is exchanged at a package level.

BRIEF SUMMARY

Various embodiments improve the use of the bandwidth of the communication between at least two integrated circuits within a System-in-Package.

In fact, the inventors have noted that it is possible to improve the use of the bandwidth if the communication interfaces have additional knowledge on the types of data that are to be transmitted.

With a view to achieving the aforesaid purpose, the various embodiments provide a communication system having the characteristics specified in claim 1. Embodiments also include a corresponding communication method. Further advantageous characteristics of some embodiments form the subject of the dependent claims.

The claims form part of the technical teaching provided herein in relation to the invention.

Various embodiments described herein refer to solutions that enable transmission of data from a first integrated circuit to a second integrated circuit within a System-in-Package.

According to the some embodiments described herein, each of the integrated circuits comprises a communication interface.

In various embodiments, said communication interface comprises a first circuit that receives data from the various submodules of the integrated circuit. In particular, said first circuit divides the data into a plurality of packets that have a determined size, and a transmission segment is generated for each of the packets.

In various embodiments, each transmission segment comprises a segment header and the respective packet as payload.

Said segments are then transmitted by a second circuit. For instance, in various embodiments, the second circuit separates the transmission segments into a plurality of physical units (PHYTs), which have a determined size, and transmits the physical units over a physical communication channel, for example the wires that connect the integrated circuits.

According to embodiments described herein, the communication interfaces determine the number of physical units that are provided for transmitting the payload and write in the segment header a value that enables identification of said number.

For instance, if the data contains a data packet (DP) comprising a header and a payload, all the bits of the payload of the segment are usually valid. For this reason, the communication interface writes in the segment header only one value that enables identification of the fact that the transmission segment contains a data packet; i.e., the communication interface transmits all the physical units of the respective segment. In fact, the inventors have noted that in this case a dedicated field for specifying the number of physical units that are valid is not necessary.

Instead, various embodiments also enable emulation of so-called virtual wires, i.e., the interface detects after certain time intervals the logic values on a plurality of lines and transmits said values to the destination.

However, in this case, the amount of effectively valid data may also be less than the size of the payload of the transmission segment. For this reason, the communication interface writes in the header a value that enables identification of the fact that the transmission segment contains data regarding a plurality of virtual wires. The communication interface also determines the number of physical units that are effectively necessary for transmitting all the virtual wires and writes in the header a value that enables direct identification of the number of physical units that are to be transmitted.

For instance, in various embodiments, the configuration interface comprises a configuration register for specifying the number of virtual wires that are to be transmitted.

BRIEF DESCRIPTION OF THE SEVERAL VIEWS OF THE DRAWINGS

The embodiments will now be described, purely by way of non-limiting example with reference to the annexed representations, wherein:

FIGS. 4 to 7 show various aspects of a second embodiment of a network interface.

DETAILED DESCRIPTION

Illustrated in the ensuing description are various specific details aimed at providing an in-depth understanding of the embodiments. The embodiments can be obtained without one or more of the specific details, or with other methods, components, materials, etc. In other cases, known structures, materials, or operations are not illustrated or described in detail so that various aspects of the embodiments will not be obscured.

The reference to "an embodiment" or "one embodiment" in the framework of the present description is intended to indicate that a particular configuration, structure, or characteristic described in relation to the embodiment is comprised in at least one embodiment. Hence, phrases such as "in an embodiment" and "in one embodiment," which may be present in different points of this description, do not necessarily refer to one and the same embodiment. Furthermore, particular conformations, structures, or characteristics can be combined adequately in one or more embodiments.

The reference numbers used herein are provided merely for reasons of convenience and hence do not define the sphere of protection or the scope of the embodiments.

As mentioned previously, various embodiments improve the use of the bandwidth of the communication between two integrated circuits (i.e., dice) within a System-in-Package.

In various embodiments, a communication network, i.e., a Network-in-Package (NiP), is used for the communication between the dice of the System-in-Package.

In various embodiments, said NiP conveys the information via data packets. For instance, said data packets can be generated by the various subcircuits within the integrated circuit. For instance, said subcircuits can be connected through a bus or a Network-on-Chip (NoC) to a network interface, which is responsible for the communication with the other integrated circuits within the SiP.

In various embodiments, the packets that are to be exchanged between a source of a communication or initiator and a destination of the communication or target comprise a header for conveying control information (for example, the identifier of the destination, the type of operation, and so forth) and a payload for conveying the effective data involved in the operation.

In various embodiments, both the header and the payload are transmitted to the data-link layer by entities referred to as "flits" (flow control units).

Figure 1:
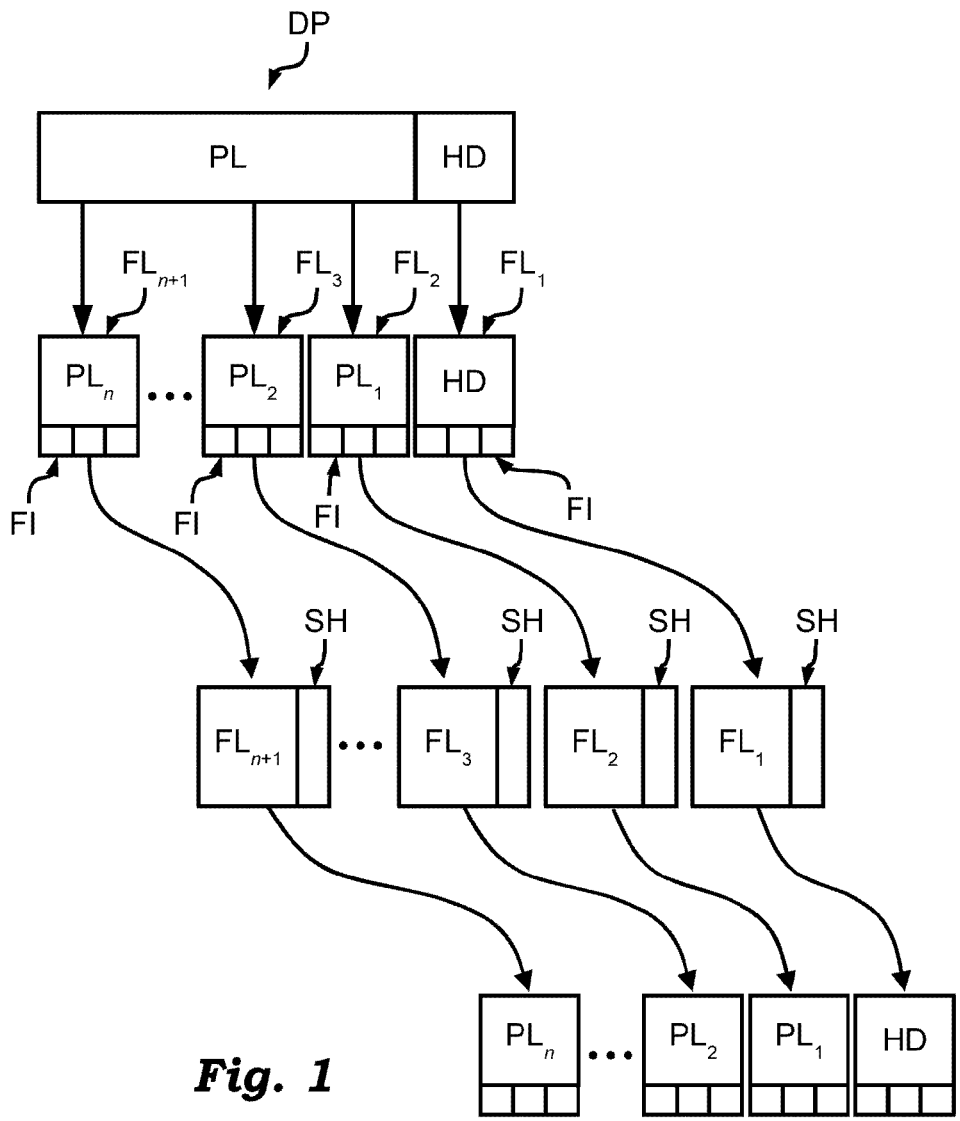
FIG. 1 shows an embodiment of a segmentation of a data packet.

For instance, FIG. 1 shows an embodiment in which a data packet DP comprising a header HD and a payload PL is transmitted.

In the embodiment considered, the data packet DP is divided into a plurality of flits. For example, in the embodiment considered, the first flit FL1 comprises the header HD, whilst the payload PL is divided into a plurality of packets PL1, PL2, . . . , PLn that are conveyed by a plurality of flits FL2, FL3, . . . , FLn+1. For instance, each flit can be made up of a sequence of 80 bits. The flits can also comprise other information FI, for example:

an identifier of the flits "flit_id", which enables identification of the start and end of a transaction;

an interface signal "aux", which identifies the type of the transaction, for example, "package" for a single data packet, or "chunk" or "message" for more complex transactions that include a plurality of packets; and/or an optional "state" field, which can identify, for example within a response packet, the receipt of a flit or possible transmission errors.

In the embodiment considered, each flit is transmitted by means of a transmission segment. For instance, in the embodiment considered, said transmission segments comprise a segment header SH and the respective flit as payload. For instance, each segment can comprise a sequence of 90 bits, wherein 10 bits comprise the segment header SH and 80 bits comprise the payload (i.e., a single flit).

In the embodiment considered, said segments are transmitted by the initiator to the destination through the Network-in-Package. The network interface of the destination receives said single segments and re-assembles the original packet.

Figure 2:
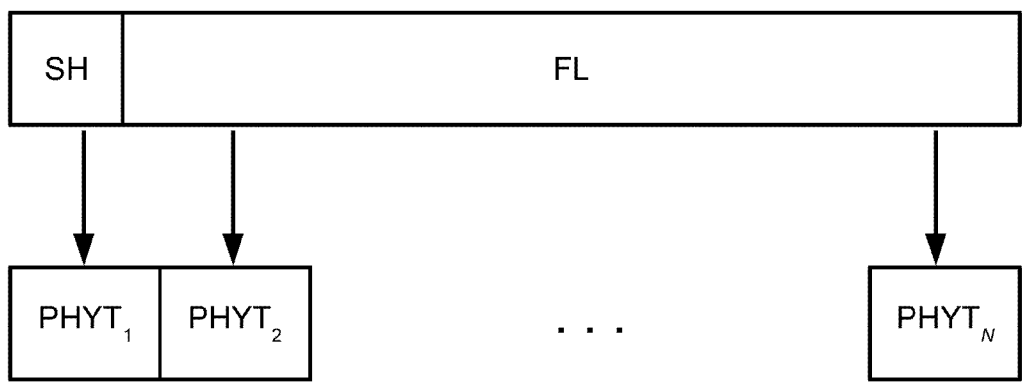
FIG. 2 shows an embodiment of the transmission of a segment of data over a physical channel.

FIG. 2 shows that said transmission segments can be fragmented further into physical units (PHYsical uniTs) PHYT1, PHYT2, . . . , PHYTN for transmission on the physical channels, for example, the wires that effectively connect the integrated circuits. In fact, this embodiment is useful if the size of the physical units is smaller than the size of the transmission segment.

The number of physical units can be determined by the size of the physical units PHYT, for example the number of wires connected in parallel and the size of the segment. For example, in the case where the physical units PHYT have a size of 15 bits, the number of physical units PHYT should be N=6 for a segment of 90 bits (i.e., 6×15=90), whilst the number of physical units PHYT should be N=13 if the physical units PHYT had a size of 7 (i.e., 13×7=91).

Figure 3:
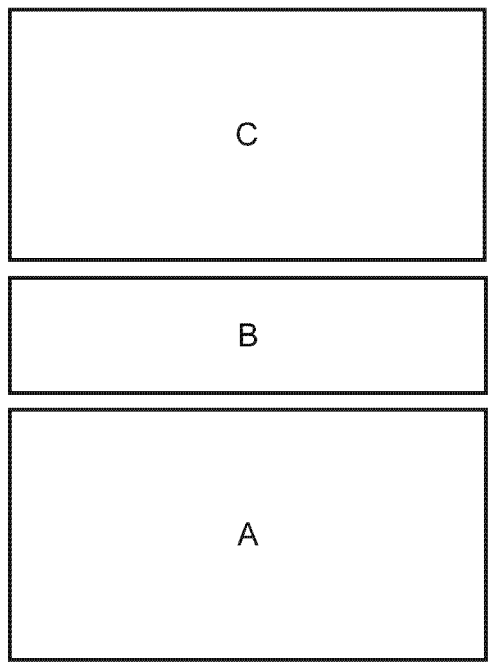
FIG. 3 shows a first embodiment of a network interface.

FIG. 3 shows a possible embodiment of a network interface for communication with the Network-in-Package. In particular, FIG. 3 shows a layer representation of the protocol stack of the communication interface described herein.

In the embodiment considered herein, the protocol stack comprises the following layers:

a physical layer PHY, which comprises, for example, 16 wires for transmitting and receiving data at 450 MHz with the Single Clock Edge (SCE) mode and/or Dual Clock Edge (DCE) mode;

a layer A responsible for encoding and/or decoding of the data, for example, for reducing the switching activity on the physical lines, and for serializing or de-serializing the data;

a layer B responsible for flow control, routing, and/or control of the quality of service (QoS); and a layer C responsible for segmentation and the re-assemblage of the packets.

This means that the layer C implements the segmentation described with reference to FIG. 1; i.e., the layer C comprises a functional module that separates the data packets in transmission segments. Further, the separation of the transmission segments in physical units described with reference to FIG. 2 is implemented in the layer A.

As mentioned previously, the layer B can effect additional operations. For instance, the layer B can re-order the various transmission segments generated for different sources in such a way as to provide a certain QoS.

In one embodiment, the layer B of the initiator can communicate directly with the layer B of the destination for exchanging information, referred to as "credit information." Said information may include, for example, information on flow control, and/or on the state of the transmitter and/or of the destination. For instance, the state information can include information that indicates the state of the transmission and/or reception buffer of the various network interfaces. For example, said buffers are implemented typically via FIFO memories of a certain size. Hence, said credit information can in general have a variable number of bits.

In the embodiment considered, said credit information is transmitted via the layer A, which divides the credit information into physical units PHYT. For instance, in one embodiment, the layer B enters said credit information as a standard data packet in a transmission segment comprising, for example, a 10-bit header and an 80-bit payload.

For instance, in the embodiment considered, the credit segment contains the following information:
 the identifier of the FIFO to which the credit information refers; and
 the value of the credit, i.e., value identifying the number of locations of the FIFO freed, i.e., the number of further flits that can be sent from the transmitter to the FIFO specified in the receiver.

In the embodiment considered, the size of the credit segment is variable. For instance, in the case where the physical units PHYT have a size of 8 bits, 10 bits are allocated to transmit the header; hence, at the start at least two physical units PHYT are provided (8+8 bits) for transmitting one item of credit information. However, with two physical units PHYT in this embodiment, the maximum value of the credit that can be transmitted is at 6 bits, i.e., 63. Instead, in the case where the credit value to be transmitted is greater than 65, more than 6 bits will be provided and hence at least one physical unit PHYT or more.

According to the some embodiments described herein, the network interface illustrated with reference to FIG. 3 is modified in such a way as to enable the transmission of virtual wires. For instance, said virtual wires may be useful for transmitting interrupt signals, handshakes for power-down, or other asynchronous events.

In some embodiments in particular, the inventors have noted that each transmission segment comprises a fixed number of bits, for example 90 bits, where 80 bits form the payload of the segment. However, the signals generated for the virtual wires can include even less data. For instance, in the case of a single virtual row, only a single bit would contain useful information. For instance, in the case where the physical units PHYT have a size of 7 bits, a 90-bit segment would be transmitted with N=13 physical units PHYT. However, two physical units PHYT would be sufficient for the transmission of a single interrupt, because 14 bits would be sufficient for conveying the segment header SH and the single bit for the line of interrupt.

As mentioned previously, the credit information can have a variable number of bits. Hence, the same considerations presented above with reference to the virtual wires, apply in a substantially similar way also to the segments of the credit type.

According to the solution described herein, the network interface illustrated with reference to FIG. 3 is then modified in such a way as to transmit only the physical units PHYT that really contain useful information.

Figure 4:
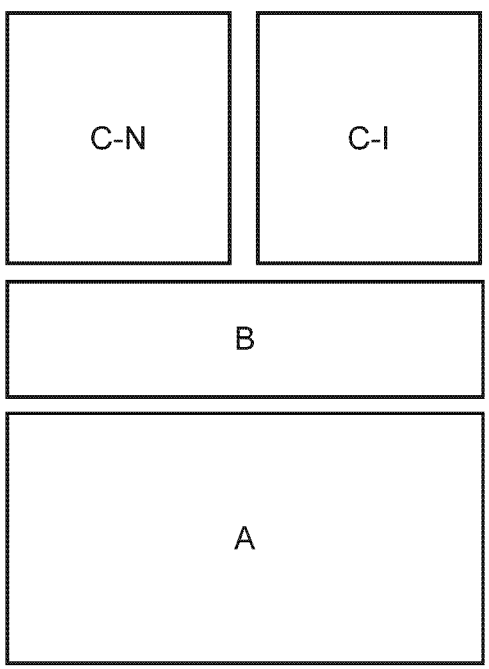

FIG. 4 shows a possible embodiment of such a network interface.

In the embodiment considered, the layer C is separated into two submodules:
 a first module C-N is responsible for management of the transactions of standard data packets, for example NoC data packets that are generated by the various submodules within the integrated circuit and that are to be transmitted to another circuit integrated within the SiP; and
 a second module C-I is responsible for emulation of the virtual wires.

Figure 5:
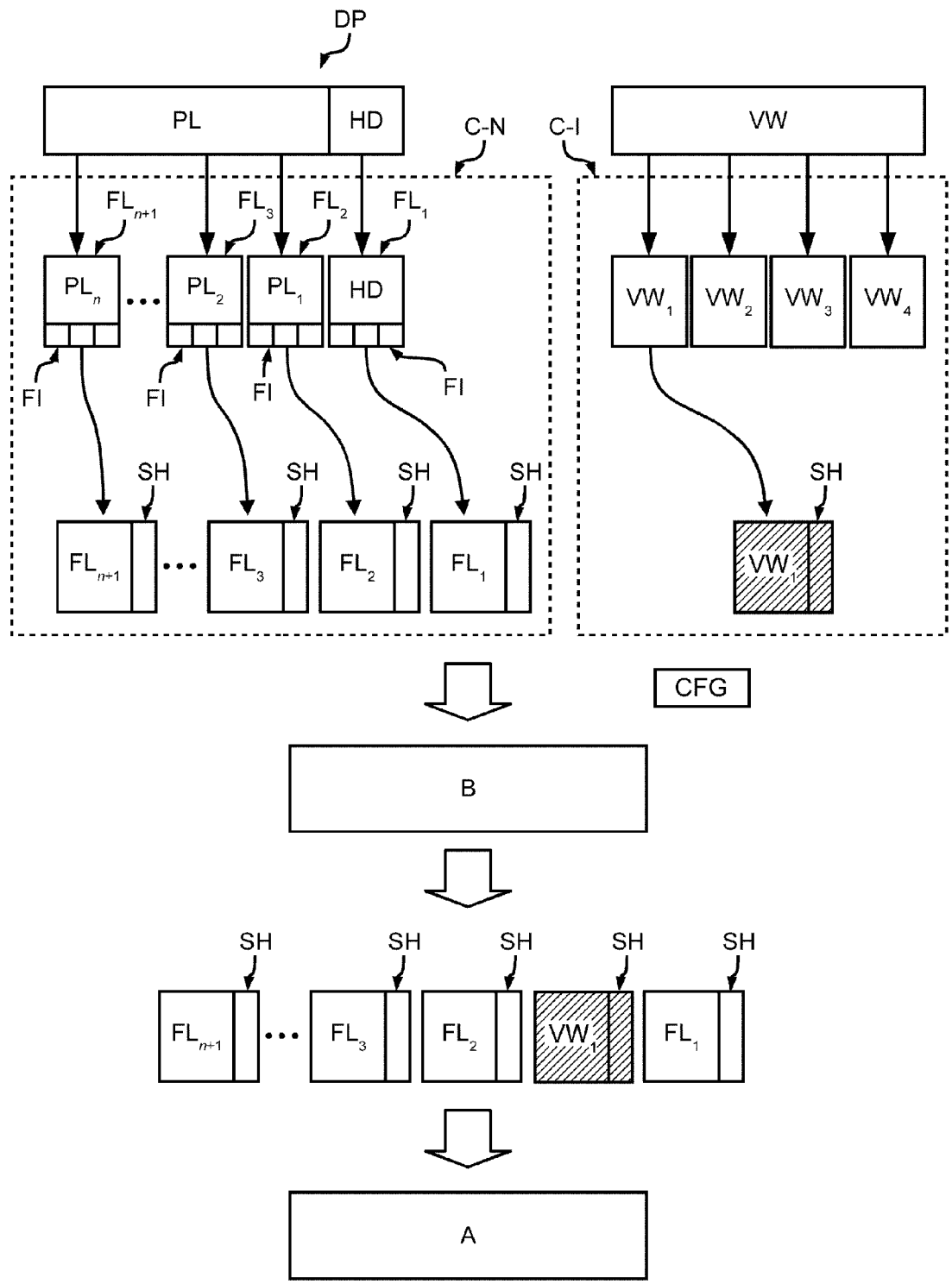

FIG. 5 shows a possible embodiment in which a data packet DP is transmitted, which comprises a header HD and a payload PL and a set of virtual wires VW.

In the embodiment described, the data packet DP is transmitted, as described with reference to FIG. 1, i.e., the module C-N divides the packet DP into a plurality of flits and each flit is transmitted by means of a transmission segment that comprises a header SH.

Said segmentation procedure is applied in a substantially similar way also to the virtual wires VW, i.e., the module C-I divides the information for the virtual wires into a plurality of subsets VW1, VW2, VW3 and VW4 and each subset is transmitted by means of a transmission segment that comprises a header SH.

FIG. 5 also shows that the layer B can schedule the transmission of the transmission segments and insert a transmission segment of the virtual wires between those of the data packets. Furthermore, in the case where the layer B manages also information of the credit type, the layer B can also insert the transmission segments for said information in the data flow.

In the embodiment considered, the network interface comprises at least one configuration register for specifying the subsets of virtual wires (bundles). For instance, in the embodiment considered, four subsets of virtual wires VW1, VW2, VW3 and VW4 can be specified, in which each subset can comprise up to 80 virtual wires.

In one embodiment, to specify the number of virtual wires in the respective subset, a configuration register CFG is used, which comprises for each subset of virtual wires a sequence of six bits. For instance, FIG. 6 shows a table which lists different sequences of bits "Seq" and the respective numbers of the virtual wires "N" for the subset.

In the embodiment considered, each of the subsets of virtual wires VW1, VW2, VW3 and VW4 is transmitted by means of a transmission segment that comprises a header SH.

In the embodiment considered, the segment header SH comprises a plurality of fields that enable correct identification of the type of the segment.

For instance, in one embodiment, the segment header comprises 10 bits, in which two bits are used for specifying the type of the segment and the other eight bits are used for specifying additional information.

For example, in the case where the segment contains a data packet DP, the sequence of bits that identifies the type of the segment would be set at "00". Another two bits can be used for specifying the number of the segment. For instance, said sequence of bits can be set at:

"01" for the first segment;
"10" for the last segment; or
"00" for an intermediate segment.

The last six bits of the header can be used for specifying a specific source of data, for example, one of the FIFO memories of the transmitter.

In the embodiment considered, in the case where the segment contained a set of virtual wires, the sequence of bits that identifies the type of the segment would be set at "01". A further two bits can be used for specifying the number of the subset, for example "00" for the first, "01" for the second, "10" for the third, and "11" for the fourth subset.

The last six bits of the header can be used for specifying the number of physical units that are provided for transmitting the respective transmission segment.

In fact, the inventors have noted that it is useful to make the calculation of the number of physical units already in the layer C-I (i.e., the layer responsible for segmentation) and not in the layer A (i.e., the layer responsible for the physical transmission of the data).

The person skilled in the art will appreciate that this approach is in contrast with the classic philosophy of the protocol stack, because a high-level layer (i.e., the layer C) is aware of the properties of a low-level layer (i.e., the layer A). However, this approach enables improvement of the hardware implementation of the solution described herein. In fact, the use of said sequence of bits in the segment header directly informs the destination of the number of physical units that are transmitted.

In the embodiment considered, the layer C, i.e., at least the module C-I, is consequently aware of the size of the physical units PHYT transmitted by the layer A.

In one embodiment, the size of the physical units PHYT is specified during design of the network interface and remains fixed.

In one embodiment, during the design only a maximum value is specified for the size of the physical units PHYT, and the current size of the physical units PHYT is specified by means of a configuration register CFG.

In one embodiment, the module C-I determines the number of physical units provided according to the number of virtual wires in the respective subset of logic wires and the size of the physical units PHYT. Next, the module C-I writes said value, for example in binary coding, in the segment header SH.

The layer A is hence immediately able to determine the number of physical units that are to be transmitted.

Figure 7:
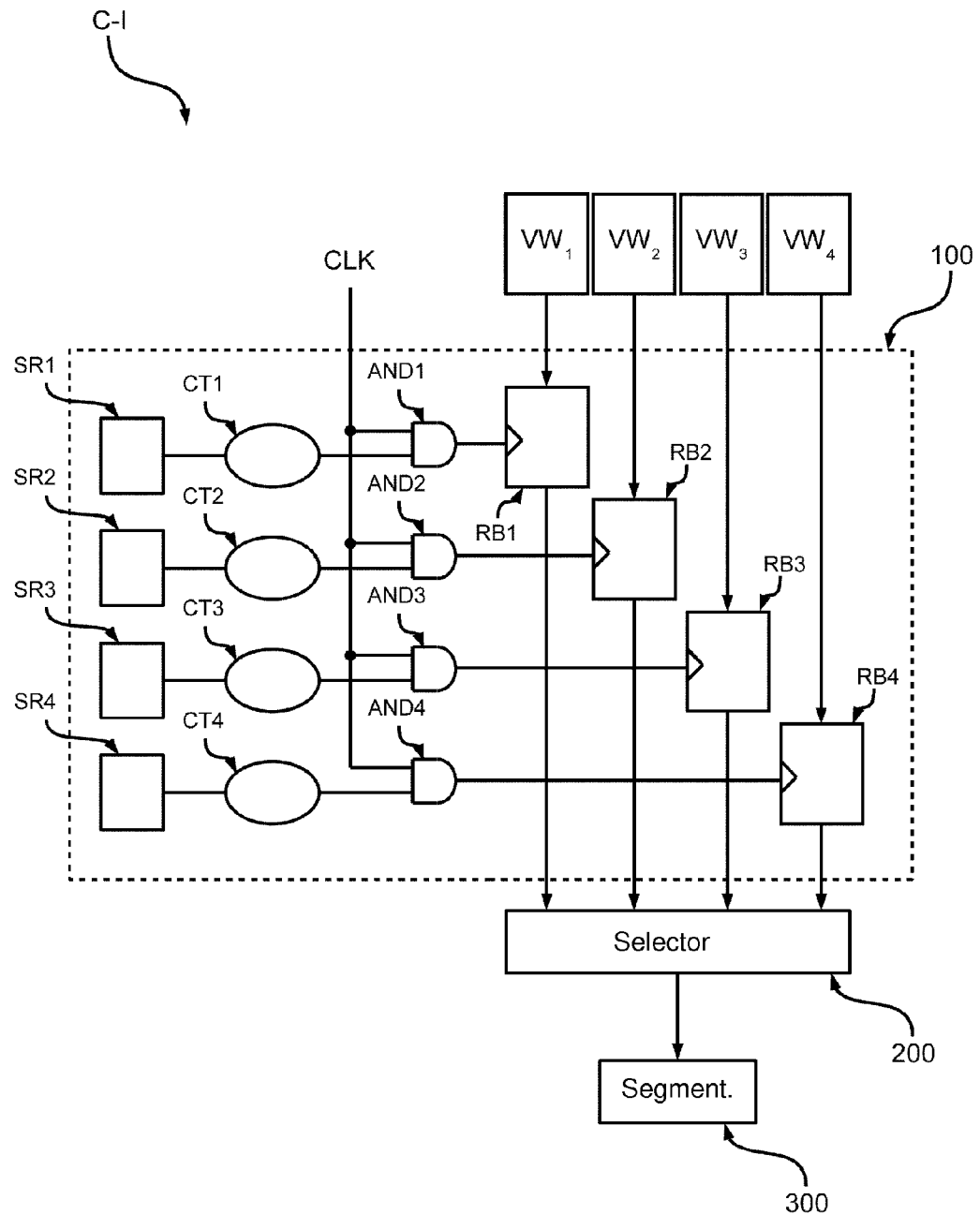

FIG. 7 shows a possible embodiment of the module C-I.

In the embodiment considered, the virtual wires VW are divided into four subsets of virtual wires, i.e., bundles VW1, VW2, VW3 and VW4.

In the embodiment considered, said subsets of virtual wires VW1, VW2, VW3 and VW4 are connected to a module 100 for detecting the logic values applied to the virtual wires, i.e., the module 100 performs a sampling operation.

In the embodiment considered, said sampling is synchronized with a clock signal CLK.

For instance, in the embodiment considered, the module 100 comprises for each bundle VW1, VW2, VW3 and VW4 a respective configuration register SR1, SR2, SR3 and SR4 for specifying the sample rate.

For instance, in the embodiment considered, the values stored in the registers SR1, SR2, SR3 and SR4 are used as maximum counting values of respective counters CT1, CT2, CT3 and CT4. For instance, said counters CT1, CT2, CT3, and CT4 can be configured for enabling by means of respective blocks AND1, AND2, AND3 and AND4, for example "and" gates, a clock signal CLK.

In the embodiment considered, said enabled clock signals are used as clock signal for respective registers RB1, RB2, RB3 and RB4 in such a way as to store the values of the signals applied to the virtual wires. The registers RB1, RB2, RB3 and RB4 hence contain the sampled values of the respective bundle VW1, VW2, VW3 and VW4.

In the embodiment considered, said sampled values are supplied to a block 200, for example a multiplexer, for selecting which of these subsets will be transmitted.

In the embodiment considered, the subset selected is supplied to a block 300 that performs the operation of segmentation described previously. In particular, in the embodiment considered, the block 300 determines the header SH according to the number of the subset selected and the respective number of virtual wires in the subset. Next, the final segment—comprising the header SH and as payload the respective sampled values—is supplied to the lower layers.

In one embodiment, the allocation of the bandwidth is improved also for the credit information, because also said information can have a size of less than 80 bits.

In the embodiment considered, said credit segments are generated by the layer B for handling flow control and/or for providing a certain quality of service.

For instance, in the case where the segment contained credit information, the sequence of bits that identifies the type of the segment would be set at "10".

For instance, in one embodiment only two bits are used for specifying the number of physical units that are to be transmitted, whilst the last six bits of the header can be used for specifying additional information. For instance, said information can include directly the reference of the buffer for which the respective credit information is valid.

The solution described herein hence enables improvement of the bandwidth that is available for data transmission. For instance, for the case provided by way of example described above, the gain is 35 GB/s (i.e., 11 cycles at 450 MHz with 7 bits transmitted in each cycle). Said bandwidth can thus be used for other communications.

The solution described herein also enables reduction in the latency of the communication. In fact, the destination is able to reconstruct the entire segment already after reception of the first two physical units PHYT, and the corresponding information is immediately available.

Of course, without prejudice to the principle of the invention, the details of implementation and the embodiments may vary widely with respect to what is described and illustrated herein purely by way of non-limiting example, without thereby departing from the scope of the present invention, as defined by the claims.

For instance, the solution described herein for improving the use of the bandwidth of the communication between two integrated circuits within a System-in-Package could also be applied to the communication between two subcircuits within a System-on-Chip. However, the physical channels within a SoC are usually quite wide and the frequencies involved much higher than in the die-to-die case.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication system for transmitting data comprising:
   a first circuit configured to:
      a) divide said data into a plurality of packets having a determined dimension, and
      b) generate for each packet a transmission segment having a segment header and the respective packet as payload;
   a second circuit configured to:
      a) separate said transmission segments into a plurality of physical units, wherein said physical units have a determined dimension, and
      b) transmit said physical units over a physical transmission channel; and
   a third circuit configured to perform a flow control, routing, or quality of service control operation;
   wherein said third circuit is configured to generate at least one value identifying a state of said system as payload, wherein said segment header includes a physical units field configured to identify a number of physical units which are provided to transmit said at least one value identifying the state of said system, and wherein said second circuit is configured to transmit the number of physical units identified in said physical units field.

2. The system according to claim 1 wherein said segment header includes a first field configured to identify a type of said data.

3. The system according to claim 2 wherein if said data contains a data packet having a header and a payload, said first field is configured to contain a first value, and wherein said second circuit is configured to transmit a determined number of physical units.

4. The system according to claim 2 wherein if said data contains logic values being representative of signals applied to a set of virtual wires, said first field is configured to contain a second value, wherein said segment header includes a second field configured to identify a number of physical units provided to transmit said logic values, and wherein said second circuit is configured to transmit the number of physical units identified in said second field.

5. The system according to claim 1 wherein said first circuit includes a configuration register configured to specify a number of virtual wires to be transmitted.

6. The system according to claim 5 wherein said configuration register is configurable to specify a plurality of subsets of virtual wires.

7. A System in Package including at least two integrated circuits wherein each of said at least two integrated circuits includes a communication system comprising:
   a first circuit configured to divide data into a plurality of N-bit packets, the first circuit further configured to generate a transmission segment having a segment header and a payload, the payload including one N-bit packet of the plurality of N-bit packets;
   a second circuit configured to perform a flow control, routing, or quality of service control operation, wherein said third circuit is configured to generate at least one value identifying a state of said system as payload; and
   a third circuit configured to separate the transmission segment into a plurality of M-bit physical units, the third circuit configured to transmit the plurality of M-bit physical units and the at least one value identifying the state of said system over a physical transmission channel, wherein the segment header includes at least one field configured to identify a number of M-bit physical units to be transmitted.

8. The System in Package according to claim 7 wherein N is 80 and M is 15.

9. The System in Package according to claim 7 wherein the at least one field of the segment header is configured to identify a type of said data.

10. The System in Package according to claim 7 wherein if the data contains a data packet having a header and a payload, the segment header includes another field configured to contain a start of transaction indicator or an end of transaction indicator.

11. The System in Package according to claim 7 wherein the third circuit is configured to transmit the number of M-bit physical units identified in the at least one field if the data contains logic values representative of signals applied to a set of virtual wires.

12. The System in Package according to claim 7 wherein said first circuit includes a configuration register configured to hold a value identifying a number of virtual wires to be transmitted.

13. A method of transmitting comprising:
   dividing data into a plurality of packets having a determined dimension;
   generating for each packet a transmission segment having a segment header and a payload, the payload including the respective packet;
   performing a flow control, routing, or quality of service control operation;
   generating at least one value identifying a state of said system as payload;
   separating said transmission segments into a plurality of physical units, wherein said physical units have a determined dimension;
   transmitting said physical units over a physical transmission channel; and
   transmitting the at least one value identifying the state of said system over the physical transmission channel;
   wherein said segment header includes at least one field, the at least one field configured to identify a number of physical units to be transmitted.

14. The method of transmitting according to claim 13, comprising:
   loading a type identifier value into the at least one field of the segment header.

15. The method of transmitting according to claim 13, comprising:
   loading a start of transaction indicator value or an end of transaction indicator value into the at least one field of the segment header.

16. The method of transmitting according to claim 13, comprising:
   loading a configuration register with a value identifying a number of virtual wires to be transmitted.

* * * * *